US011521306B2

(12) United States Patent
Nashizawa

(10) Patent No.: US 11,521,306 B2
(45) Date of Patent: Dec. 6, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hiroaki Nashizawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/751,352

(22) Filed: Jan. 24, 2020

(65) Prior Publication Data
US 2020/0242745 A1 Jul. 30, 2020

(30) Foreign Application Priority Data

Jan. 30, 2019 (JP) .............................. JP2019-014481

(51) Int. Cl.
*G06T 5/50* (2006.01)
*G06T 5/00* (2006.01)
(Continued)

(52) U.S. Cl.
CPC ................ *G06T 5/50* (2013.01); *G06T 5/009* (2013.01); *G06T 2207/20208* (2013.01)

(58) Field of Classification Search
CPC ................ G06F 9/445; G06T 2200/24; G06T 2207/10024; G06T 2207/20104; G06T 2207/20208; G06T 2207/30201; G06T 5/007; G06T 5/009; G06T 5/50; H04L 67/02; H04L 67/06; H04L 67/1097;
(Continued)

(56) References Cited

U.S. PATENT DOCUMENTS 6,282,317 B1 * 8/2001 Luo .................... G06K 9/00234
382/203
2004/0101207 A1 5/2004 Langan
(Continued)

FOREIGN PATENT DOCUMENTS

| CN | 104917930 A | 9/2015 |
| CN | 107295248 A | 10/2017 |
| JP | 6105241 B2 | 3/2017 |

OTHER PUBLICATIONS

Deborah J. Rumsey, "Statistics for dummies," 2011, Wiley Publishing, Inc., 2nd Edition, Chapters, p. 71-94 (Year: 2011).*
(Continued)

*Primary Examiner* — Sing-Wai Wu
(74) *Attorney, Agent, or Firm* — Cowan, Liebowitz & Latman, P.C.

(57) ABSTRACT

An image processing apparatus comprises a changing unit configured to change a display area of an image from a first display area to a second display area including at least a portion of the first display area, an acquiring unit configured to acquire a first value indicating luminance, in which brightness contrast is considered, in an image displayed in the first display area and a second value indicating luminance, in which brightness contrast is considered, in an image displayed in the second display area, and a correcting unit configured to correct luminance of the image displayed in the second display area based on the first value and the second value that are acquired by the acquiring unit.

13 Claims, 11 Drawing Sheets

(51) Int. Cl.
*H04N 9/64* (2006.01)
*G06T 3/40* (2006.01)
*G06T 5/20* (2006.01)

(58) Field of Classification Search
CPC . H04L 67/26; H04L 67/2842; H04L 67/2857; H04W 12/06
See application file for complete search history.

(56) References Cited

U.S. PATENT DOCUMENTS

| | | | |
|---|---|---|---|
| 2005/0169601 A1* | 8/2005 | Mears | H04N 7/0122 386/242 |
| 2009/0122159 A1* | 5/2009 | Sakaue | H04N 5/232939 348/333.01 |
| 2009/0289968 A1* | 11/2009 | Yoshida | G09G 3/2081 345/691 |
| 2015/0213586 A1 | 7/2015 | Koike et al. | |
| 2017/0229099 A1* | 8/2017 | Mito | G09G 5/10 |
| 2017/0353704 A1* | 12/2017 | Su | G09G 5/00 |
| 2018/0108161 A1 | 4/2018 | Mok et al. | |
| 2018/0182075 A1 | 6/2018 | Sasaki | |

OTHER PUBLICATIONS

The above patent documents were cited in a British Search Report dated Jun. 9, 2020, which is enclosed, that issued in the corresponding U.K. Patent Application No. GB1919384.6.
The above documents were cited in a Oct. 11, 2021 Chinese Office Action, which is enclosed with an English Translation, that issued in Chinese Patent Application No. 202010068686.3.

* cited by examiner

FIG. 10
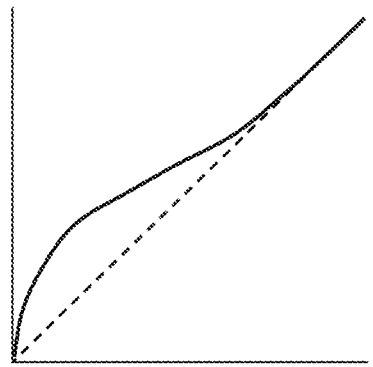
FIG. 11A  FIG. 11B
 

IMAGE PROCESSING APPARATUS, IMAGE PROCESSING METHOD, AND STORAGE MEDIUM

BACKGROUND OF THE INVENTION

Field of the Invention

The present invention relates to an image processing technology with which the quality of an image can be preferably adjusted.

Description of the Related Art

In recent years, due to the advancement of LED elements for displays and the like, displays compatible with HDR (high dynamic range) that can improve the sharpness of black and increase the luminance that is already high have been introduced to the market. With such displays, image data having a so-called high dynamic range (hereinafter, referred to as "HDR") whose dynamic range is larger than that of known displays can be displayed as is without performing compression.

In the HDR, the tones of clouds in a blue sky whose contrast decreases with the conventional dynamic range (hereinafter, referred to as "SDR") and scenery such as neon signs in a night scene can be realistically reproduced. On the other hand, a phenomenon is becoming apparent that, if the brightness of a bright portion is too high and is dazzling, the main subject is perceived to be relatively dark.

This phenomenon is considered to be caused by the simultaneous contrast, of color contrasts of the human visual property, that occurs when colors are spatially adjacent to each other. The simultaneous contrast includes, other than brightness contrast, saturation contrast in which the saturation of a color that surrounded by colors with high saturation is perceived to be decreased. This phenomenon is a phenomenon in which the difference between dark and bright is enhanced, and it is possible to say that this is the real HDR image quality, but there are cases where it cannot be said that such images are preferable if, on the other hand, the brightness of a main subject, specifically a person's face, decreases.

FIGS. 11A and 11B are diagrams illustrating an example of the brightness contrast. FIG. 11A shows a display image in an SDR display, and FIG. 11B shows a display image in an HDR display. In such cases, it is envisioned that a user performs adjustment such that the darkened face is brightened using an image quality adjusting function of a camera when shooting is performed and that of a PC application when development is performed. A method in which, in a UI that is shown as a one-dimensional lookup table (LUT) such as a tone curve, in PC applications, only the luminance of a dark portion is increased is used as a general method of the brightness adjustment.

Here, it is envisioned that the adjustment of image quality is performed along with using an enlargement function of PC applications. FIG. 12A shows an enlarged image in the SDR display, and FIG. 12B shows an enlarged image in the HDR display. Here, it is anticipated that, in FIG. 12B, because the high luminance region that occupies most of the area before enlargement has greatly decreased due to enlargement, and the influence of the brightness contrast is reduced, the user does not feel that the person's face is too dark. In this state, since the user does not feel that the person's face is dark, the user does not understand how much the brightness of the face should be corrected. In this way, in retouch work on an HDR image using a PC application, it is necessary to consider the influence of brightness contrast more than in the case of SDR.

Therefore, in Japanese Patent No. 6105241, a contrast profile method is disclosed as a method of quantitatively handling the influence of brightness contrast, for example. In the contrast profile method, the amount of contrast in luminance between an object to be viewed and a surrounding region is defined as a value obtained by adding the result obtained by multiplying a logarithmic luminance image centered on the object to be viewed by a weighting function that is positive at the center and negative at the periphery. The weighting function is for performing filtering while the detection wavelength is set from a long wavelength to a short wavelength. This is actually approximated by wavelet decomposition. The decomposed amounts of contrast are respectively multiplied by coefficients according to the detection wavelength, and the results are integrated, and as a result, an image (hereinafter, referred to as a "brightness perceptual image") on which contrast effects are quantitatively reflected can be obtained.

FIG. 13A shows an example of a luminance image, and FIG. 13B shows an example of a brightness perceptual image obtained from the luminance image. In FIG. 13A, although the luminance values of upper tree branches and a lower stone pavement are almost the same, for example, because the upper tree branches are surrounded by a sky having high luminance, the tree branches are perceived to be particularly dark due to being largely influenced by the brightness contrast. On the other hand, in FIG. 13B, signal values of the upper tree branches are lower than those of the lower stone pavement, d it can be said that the influence of brightness contrast is quantitatively reflected thereon.

However, in Japanese Patent No. 6105241 described above, a method for specifically correcting the brightness of an input image using a brightness perceptual image obtained from a luminance image is not referred to. In addition, a method of dynamically considering the influence of brightness contrast in a retouch function including enlarging display such as a PC development application is also not considered.

SUMMARY OF THE INVENTION

The present invention has been made in view of the problems described above, and provides an image processing apparatus that can improve the usability when brightness adjustment is performed on HDR images.

According to a first aspect of the present invention; there is provided an image processing apparatus comprising: at least one processor or circuit configured to function as: a changing unit configured to change a display area of an image from a first display area to a second display area including at least a portion of the first display area; an acquiring unit configured to acquire a first value indicating luminance, in which brightness contrast is considered, in an image displayed in the first display area and a second value indicating luminance, in which brightness contrast is considered, in an image displayed in the second display area; a correcting unit configured to correct luminance of the image displayed in the second display area based on the first value and the second value that are acquired by the acquiring unit.

According to a second aspect of the present invention, there is provided an image processing method comprising: changing a display area of an image from a first display area to a second display area including at least a portion of the first display area; acquiring a first value indicating luminance, in which brightness contrast is considered, in an image displayed in the first display area and a second value indicating luminance, in which brightness contrast is considered, in an image displayed in the second display area; correcting luminance of the image displayed in the second display area based on the first value and the second value that are acquired in the acquiring.

Further features of the present invention will become apparent from the following description of exemplary embodiments with reference to the attached drawings.

BRIEF DESCRIPTION OF THE DRAWINGS

FIG. 10 is a diagram illustrating a one-dimensional LUT for adjusting brightness for each luminance.

FIGS. 11A and 11B are image diagrams in full angle of view of an SDR development result and an HDR development result.

DESCRIPTION OF THE EMBODIMENTS

Hereinafter, embodiments of the present invention will be described in detail with reference to the attached drawings.

First Embodiment

Figure 1:
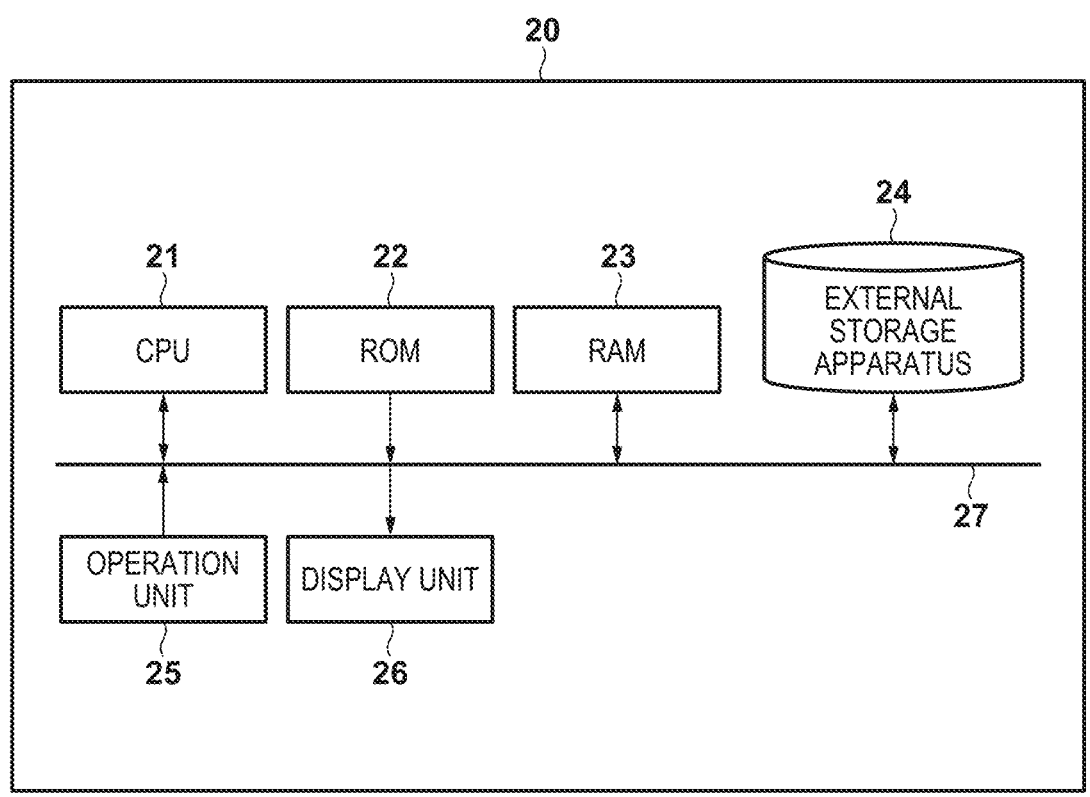
FIG. 1 is a block diagram illustrating a schematic configuration of an image processing apparatus according to a first embodiment of the present invention.

FIG. 1 is a block diagram illustrating a schematic configuration of an image processing apparatus 20 of a first embodiment of the present invention. The image processing apparatus 20 includes a CPU 21, a ROM 22, a RAM 23, an external storage apparatus 24, an operation unit 25, a display unit 26, and a system bus 27. The CPU 21 performs overall control on the image processing apparatus 20. The ROM 22 stores control programs such as BIOS needed to activate the image processing apparatus 20, programs that do not need modification, parameters, and data. The RAM 23 includes a work area for the CPU 21, a primary storage region for temporarily storing various types of data, a region for loading various programs, and the like. The external storage apparatus 24 stores an OS program, various control programs, programs of various types of software that can be executed on the OS program, various types of data, and the like. The external storage apparatus 24 is a hard disk or a flash memory that is incorporated in the image processing apparatus 20 or attachable/detachable to/from the image processing apparatus 20, a flexible disk, an optical disk, a magneto-optical disk, an IC card, or a memory card that is attachable/detachable to/from the image processing apparatus 20, or the like. The operation unit 25 is a keyboard, a mouse, a touch panel, and the like, and accepts an operation made by a user and gives an instruction to the CPU 21. The display unit 26 has a function of displaying a user interface of the OS and software that are running on the image processing apparatus and various types of information, and is a liquid crystal display, for example. The system bus 27 communicably connects blocks that constitute the image processing apparatus 20.

The image processing apparatus 20 may be a dedicated apparatus that develops and edits a shot RAW image, and in this case, a RAW development program can be stored in the ROM 22. Also, a general-purpose personal computer (PC) can function as the image processing apparatus 20 by a CPU extracting the RAW development program stored in an external storage apparatus to a RAM. Moreover, an image capturing apparatus that can acquire a RAW image by capturing can also function as an image processing apparatus by its control unit executing the RAW development program.

The RAW development program is a software (application) program for performing image processing for creating an image that can be appreciated in a display or the like by performing RAW development. The image processing method that is to be executed by the image processing apparatus 20 will be described in the following.

The RAW development program can be activated using a known method.

For example, a user causes the display unit 26 to display an icon of an image file by operating the operation unit 25, and drags and drops the icon to an icon of the RAW development program. By doing so, the RAW development program is activated, and image data of the image file is read. Also, the RAW development program can be activated from a menu screen or the like of the OS that is displayed in the display unit 26 by operating the operation unit 25. In this case, the image data may be read from the user interface of the RAW development program that is displayed in the display unit 26. Furthermore, the RAW development program can also be activated using a method of further selecting software to be started in a state in which an image file has been selected by the operation unit 25.

Figure 2:
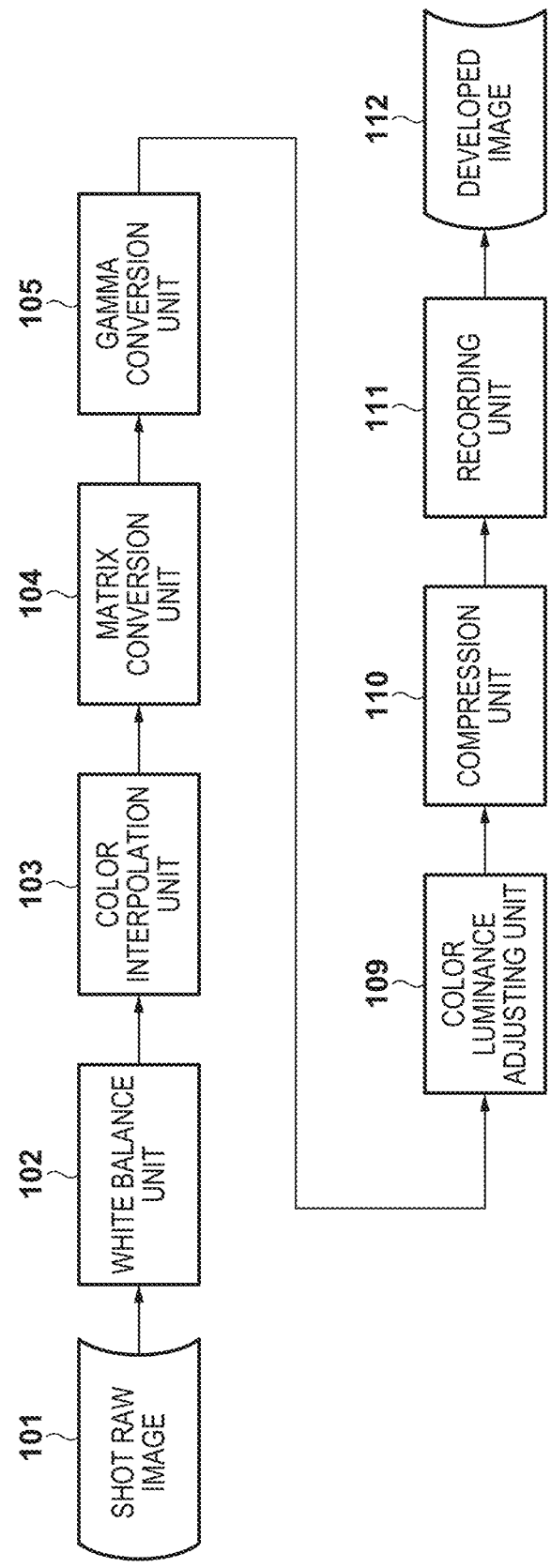
FIG. 2 is a block diagram illustrating processing steps of general development processing.

FIG. 2 illustrates general processing steps of RAW development processing. The RAV development processing will be described in detail with reference to FIG. 2. The pixel data of each pixel of a RAW image 101 captured by an image capturing apparatus is image data having an intensity only in a single color plane. A white balance unit 102 performs processing for increasing whiteness of white color. Specifically, RGB data of each pixel constituting captured image data is plotted in a predetermined color space such as an xy color space, and R, G, and B values of data that is plotted, as a result, in the vicinity of a blackbody radiation locus that is highly possibly a light source color in the color space are integrated. Also, white balance coefficients G/R and G/B of the R component and the B component are obtained from the integrated value. The white balance processing is performed using the white balance coefficients generated in the processing described above.

A color interpolation unit 103 generates a color image including all pieces of color information of R, G, and B in all the pixels by performing noise reduction processing and processing for interpolating a color mosaic image. The generated color image is processed by a matrix conversion unit 104 and a gamma conversion unit 105, and a basic color image is generated. Thereafter, a color luminance adjusting unit 109 performs processing for improving the appearance of an image. For example, image correction such as enhancing the saturation by detecting an evening scene is performed according to the scene. A compression unit 110 compresses a high resolution image subjected to a desired color adjustment using a method such as MEG or HEVC, and a recording unit 111 generates a developed image 112 that is to be recorded in a recording medium such as a flash memory.

Figure 3:
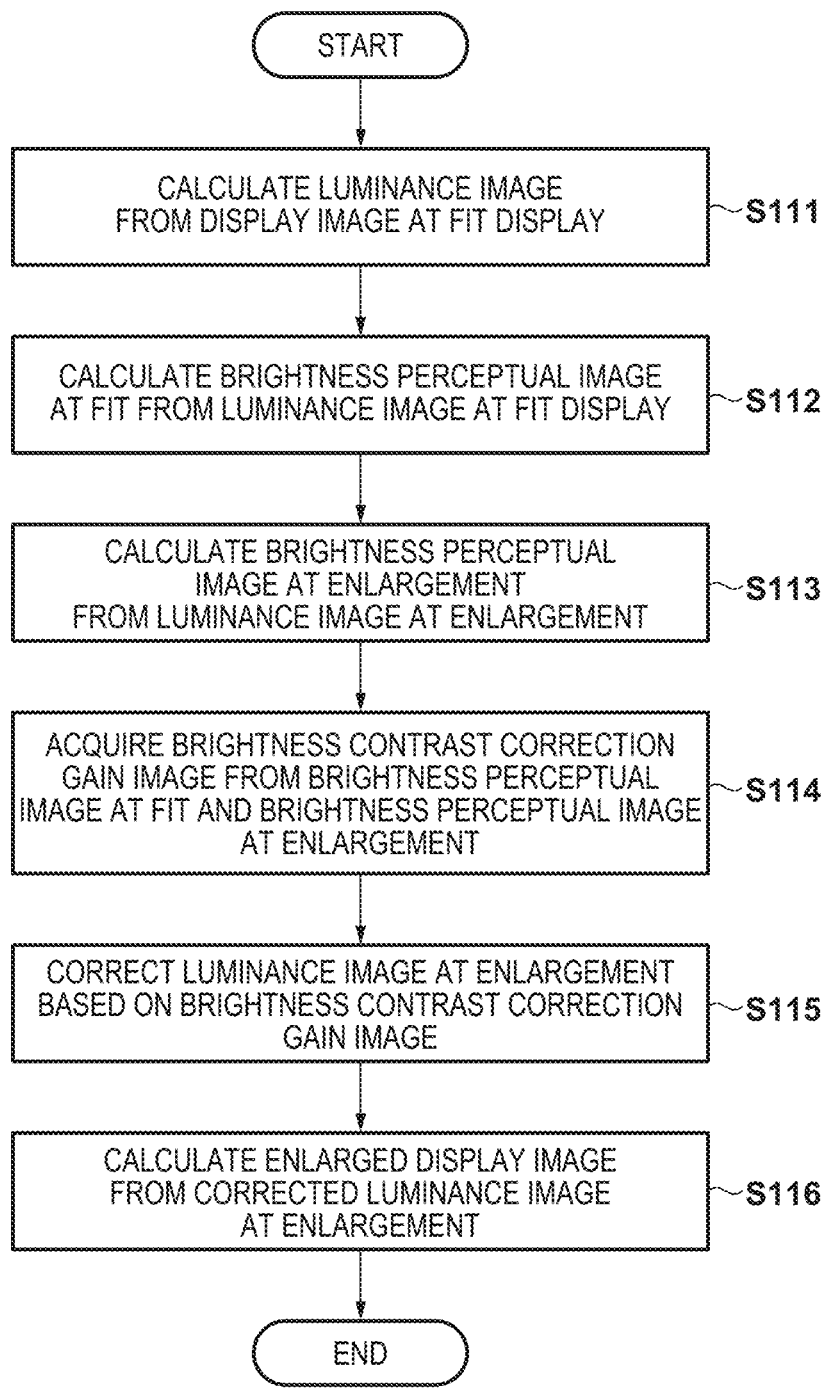
FIG. 3 is a flowchart illustrating operations of an image processing apparatus of the first embodiment.
Figure 4:
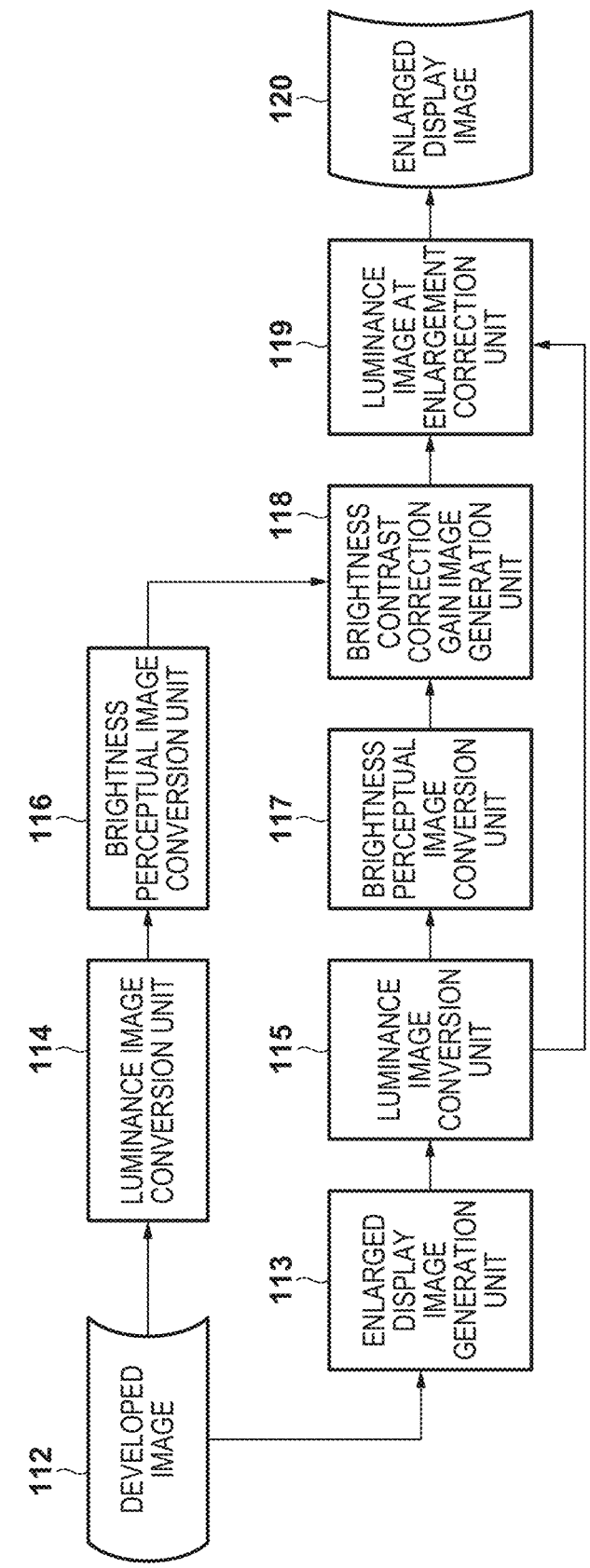
FIG. 4 is a block diagram illustrating processing steps of the image processing apparatus of the first embodiment.

In the following, the operations of the image processing apparatus 20 will be described using the flowchart in FIG. 3 and the process diagram in FIG. 4.

In the present embodiment, the developed image 112 is presented to a user in a Fit display state, which is a state in which an image of full angle of view is displayed on a PC application, as an initial state. Here, a luminance image conversion unit 114 calculates a luminance image from a Fit display image (S111). The developed image 112 is in a RGB format, in general, and therefore the developed image 112 is converted to a Y signal, which indicates luminance, using the following equation. Note that the initial state is not limited to the Fit display state, and a display in which an image is enlarged at a fixed magnification may be the initial state, for example.

$$Y = 0.3R + 0.6G + 0.1B \tag{1}$$

Also, a brightness perceptual image conversion unit 116 obtains a brightness perceptual image from the luminance image using the above-mentioned contrast profile method (S112).

Figure 5:
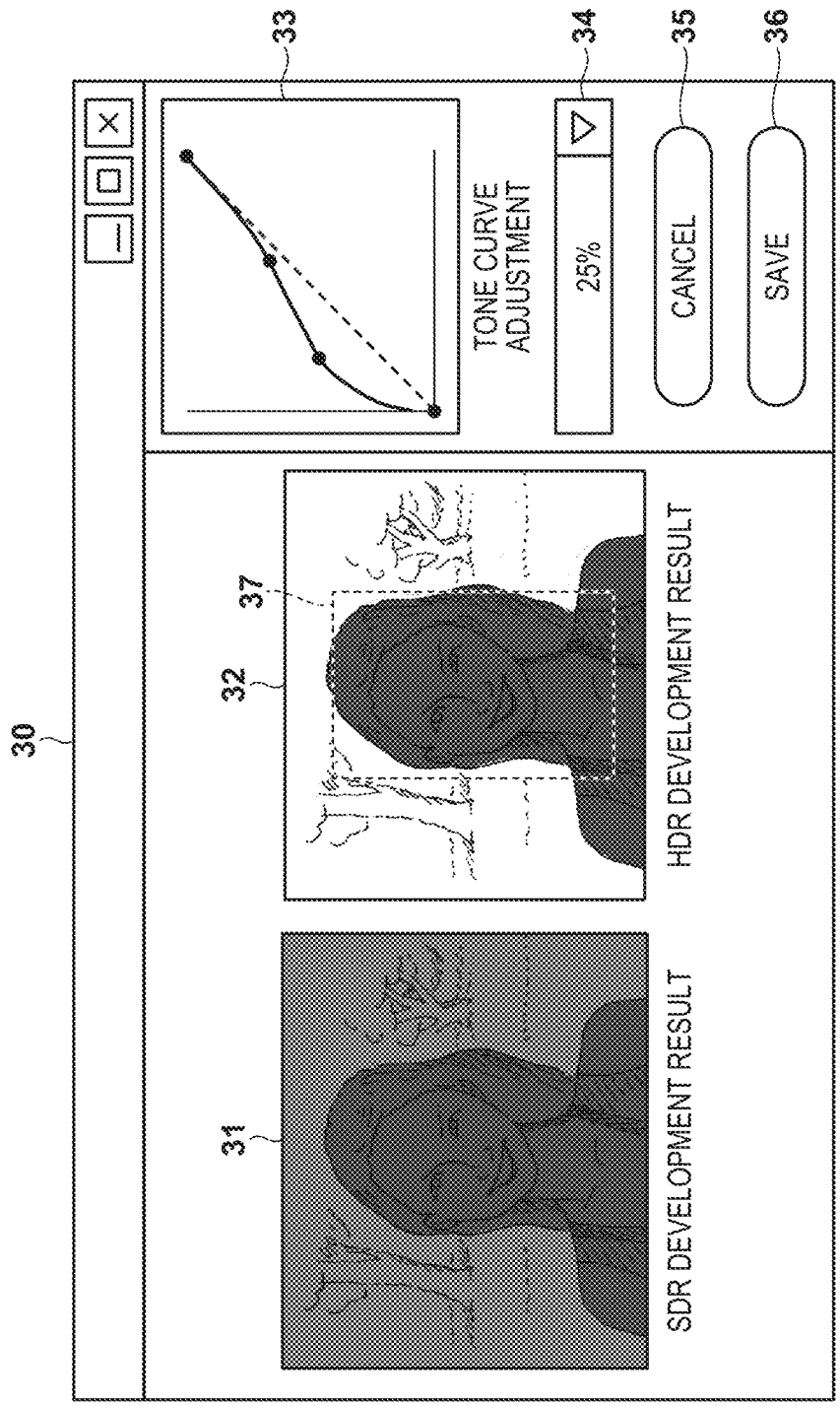
FIG. 5 is a diagram illustrating an example of a user interface for adjusting development parameters that is displayed in a display unit of the image processing apparatus.

Similarly, consider a case where the user changes the display area via the operation unit 25 in FIG. 1, that is, in the present embodiment, the user performs enlarging display operation (reducing the display area) from the Fit display state. An enlarged display image generation unit 113 acquires image data of partial angle of view of an image displayed in the display unit 26 of the PC application. If a description is given using a PC application dialog 30 in FIG. 5, as an example, the angle of view determined by the enlargement factor designated by the user using an enlargement factor setting pull-down 34 is set as the partial angle of view. Of course, the setting of the enlargement factor is not limited to using the enlargement factor setting pull-down 34. An area to be enlarge-displayed may be set by the user using a mouse or the like to set a partial region of the image data as the display area. A luminance image conversion unit 115 converts the acquired image to a luminance signal, and a brightness perceptual image conversion unit 117 further converts the luminance signal to a brightness perceptual image (S113). Next, a brightness contrast correction gain image generation unit 118 calculates the correction gain using the following equation (S114).

$$\text{Gain} = Y p\_fit / Y p\_zoom \tag{2}$$

Here, Yp_fit indicates a brightness perceptual image signal value (representative signal value) at the time of Fit display, and Yp_zoom indicates a brightness perceptual image signal value (representative signal value) at the time of enlargement, and Gain is calculated from the ratio of these values. An average value or a median value of the brightness perceptual image can be used as the representative signal value, for example. Also, if a main subject region such as a face has been detected as a result of the main subject detection processing, it is possible to calculate the representative signal value by increasing the weight of signal values in the main subject region.

A luminance image at enlargement correction unit 119 corrects the luminance image at enlargement based on the brightness contrast correction gain image (by multiplying a correction gain) (S115). The corrected luminance image at enlargement is again converted to an RGB image using a general conversion equation (S116), and the RGB image is an ultimate enlarged display image 120. This image is not used as an actual recording image, and is used only as a display image. The enlarged display image 120 has an effect of forcibly reproducing the influence of brightness contrast of the angle of view that can be viewed by enlargement.

As described above, according to the first embodiment, the user can perform retouch work while feeling the same influence of brightness contrast both at the time of Fit display and at the time of enlarged display, and can perform brightness adjustment without feeling a sense of incongruity.

Described using a specific example, consider a case where the user has performed an operation to enlarge an image including a main subject region and a background region that includes a region whose brightness is higher than that of the main subject region, for example. If, as a result of enlargement, the ratio of the main subject region relative to the background region increases, and the perceived brightness of the main subject region increases, the user performs correction to increase the brightness of the main subject region more.

Note that the above correction processing is processing that is applied when editing is performed in an enlarged display, although the ultimate recording image has the angle of view corresponding to the Fit display. In contrast, if the mode is a mode in which editing is performed in an enlarged display and recording is performed with the angle of view as is (that is, by trimming), for example, the above correction may not be performed.

Second Embodiment

Next, a second embodiment of the present invention will be described. In the first embodiment, at a time of enlarged display as well, an image for enlarged display is corrected considering the influence of the brightness contrast at a time of Fit display. That is, when the ultimate image has the angle of view corresponding to the Fit display, and editing is performed in an enlarged display, the brightness of the enlarged display image is corrected. In contrast, the second embodiment differs from the first embodiment in that, when a trimming frame is set, the influence of brightness contrast at a time of ultimate angle of view is considered before trimming, and is reflected on the display. That is, when the ultimate image is a trimmed image (that is, corresponding to the angle of view of the enlarged image), and editing is performed in the Fit display, the brightness of a Fit display image is corrected.

Figure 6:
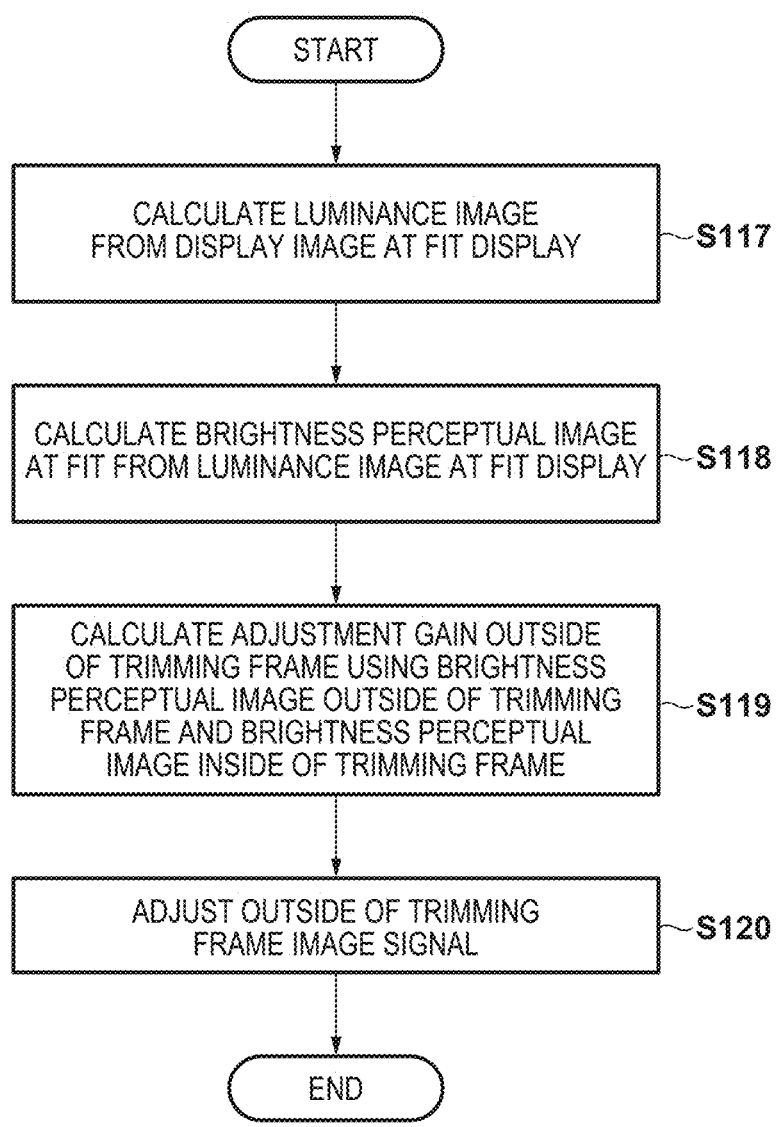
FIG. 6 is a flowchart illustrating operations of an image processing apparatus of a second embodiment.
Figure 7:
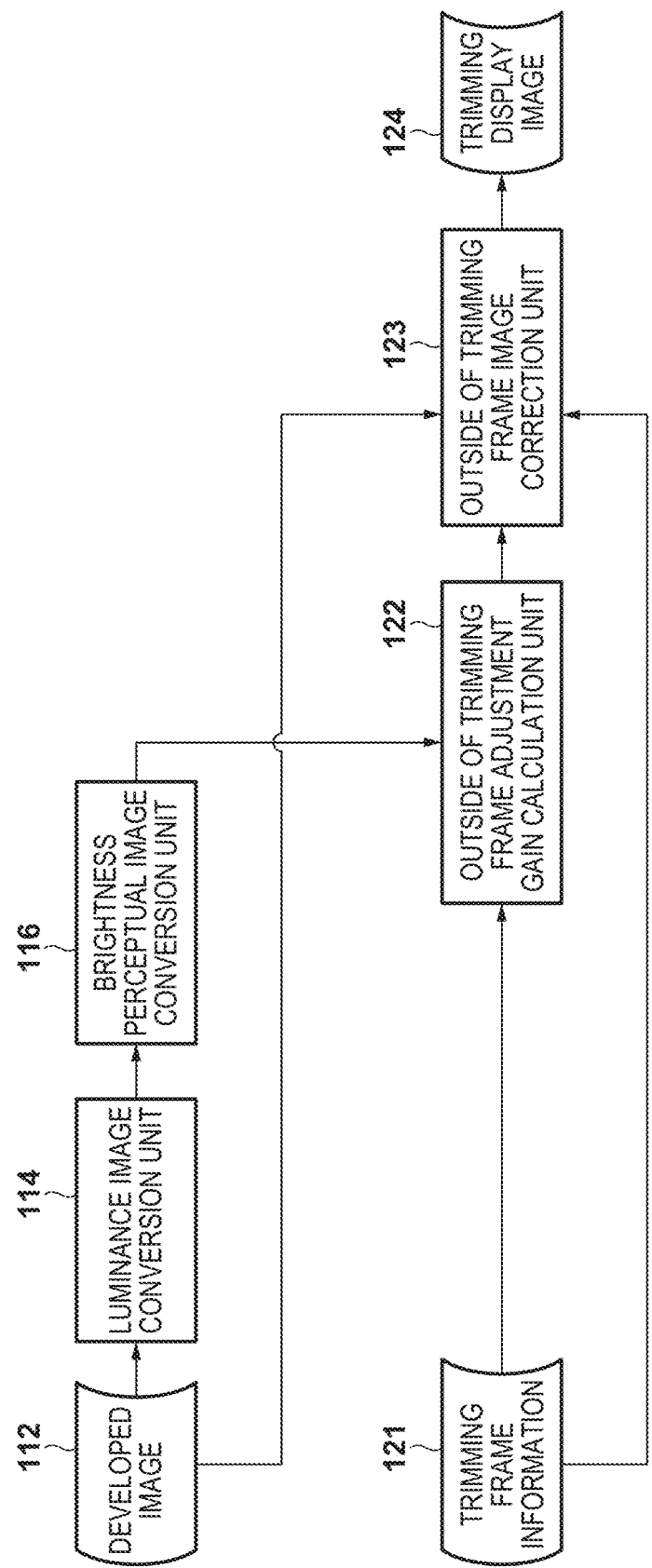
FIG. 7 is a block diagram illustrating processing steps of the image processing apparatus of the second embodiment.

FIG. 6 is a flowchart illustrating operations of an image processing apparatus of the second embodiment. Also, FIG. 7 is a diagram illustrating the processing steps. It is assumed that, similarly to the first embodiment, a developed image 112 is presented to a user in a Fit display state, which is a state in which the image is displayed on a PC application in full angle of view Here, a luminance image conversion unit 114 calculates a luminance image from an image in Fit display (S117). Then, a brightness perceptual image conversion unit 116 obtains a brightness perceptual image from the luminance image (S118). The wavelet decomposition/integration is used as the method of calculating the brightness perceptual image in the first embodiment, but in place of this method, a method of applying an unsharp mask may be used to reduce the calculation amount. Note that the unsharp mask needs to be multi-layered in a resolution direction so as to have a variation in radius, and the gain amount applied to each layer needs to be adjusted. It is desirable that parameters for improving the reproducibility of the brightness contrast are prepared as the gain amounts by performing a panel test or the like. Also, an outside of trimming frame adjustment gain calculation unit 122 calculates an adjustment gain for the outside of the trimming frame using Equation (3) using the brightness perceptual image and trimming frame information 121 indicating the portion of the angle of view to be cut out (S119). The trimming frame information is acquired from a trimming frame 37 set by the user on the PC application dialog in FIG. 5.

$$\text{Gain} = \text{average brightness perceptual image signal value inside of the trimming frame/average brightness perceptual signal value outside of the trimming frame} \quad (3)$$

Here, median values may be used instead of the average values as the values used to calculate Gain.

Finally, an outside of trimming frame image correction unit 123 obtains a trimming display image 124 by applying the calculated adjustment gain outside of the trimming frame only to the region outside of the trimming frame of the developed image 112 (S120).

As described above, according to the second embodiment, when the trimming frame is set, the brightness contrast in an ultimate frame that has been trimmed can be considered at the time of Fit display before executing the trimming. In actuality, if the region outside of the trimming frame is not displayed by darkening the region or the like in advance, the influence of the brightness contrast outside of the trimming frame can be eliminated. However, considering a case where the trimming frame is set again later, or the like, the usability can be improved if the region outside of the trimming frame is semitransparent instead of totally invisible. As a result of applying the method of the second embodiment, the degree of semitransparent can be automatically adjusted, and any scene can be handled properly.

Third Embodiment

Next, a third embodiment of the present invention will be described. In the first embodiment, the display image for retouching is manually adjusted. In contrast, the third embodiment is different from the first embodiment in that the brightness is automatically corrected considering the influence of the brightness contrast in the ultimate angle of view.

Figure 8:
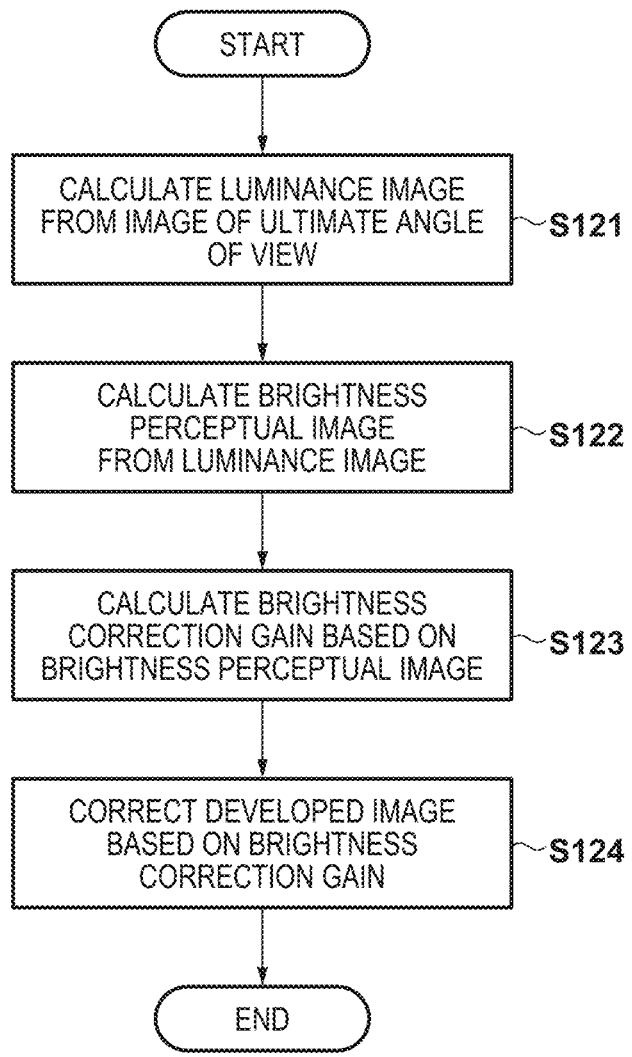
FIG. 8 is a flowchart illustrating operations of an image processing apparatus of a third embodiment.
Figure 9:
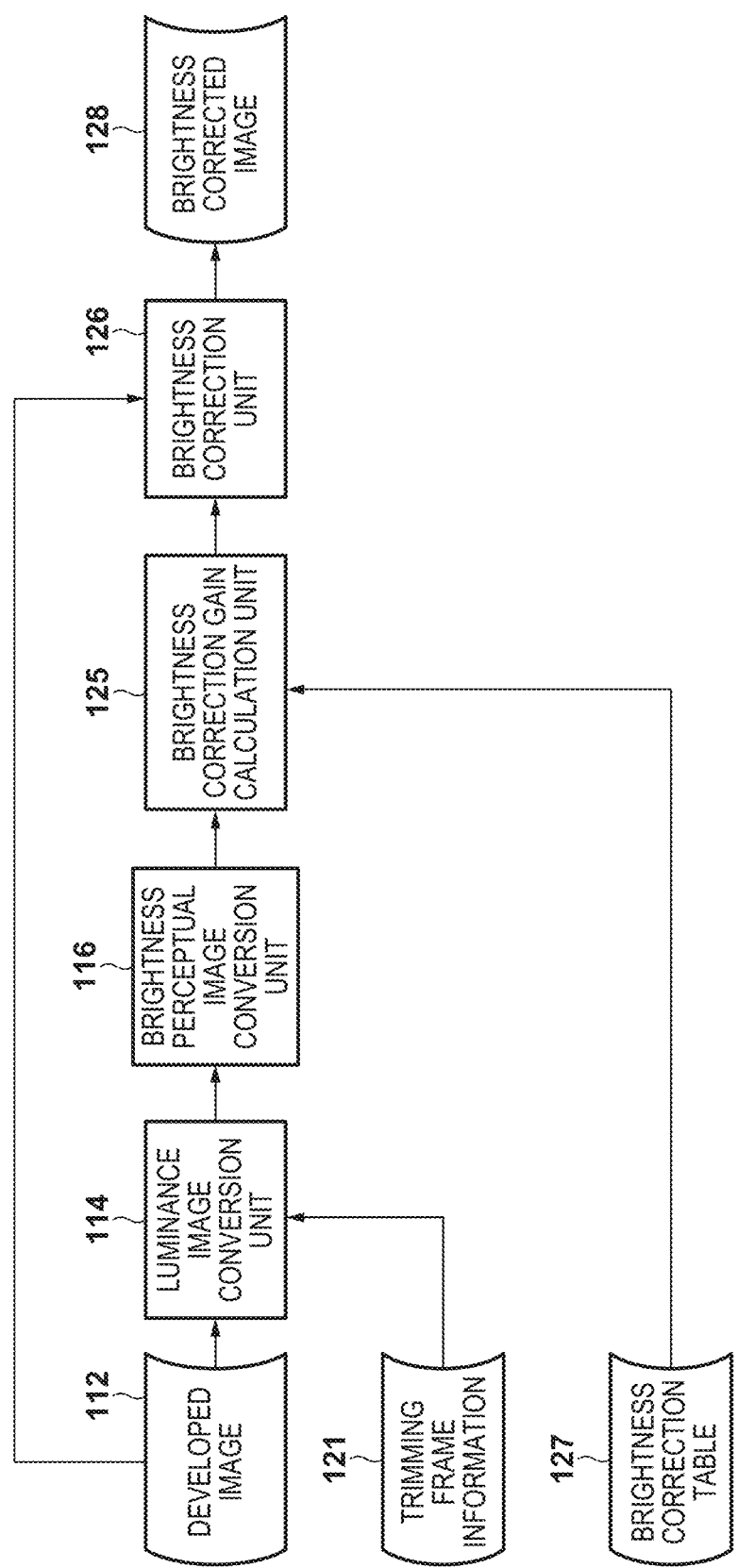
FIG. 9 is a block diagram illustrating processing steps of the image processing apparatus of the third embodiment.
Figure 12A:
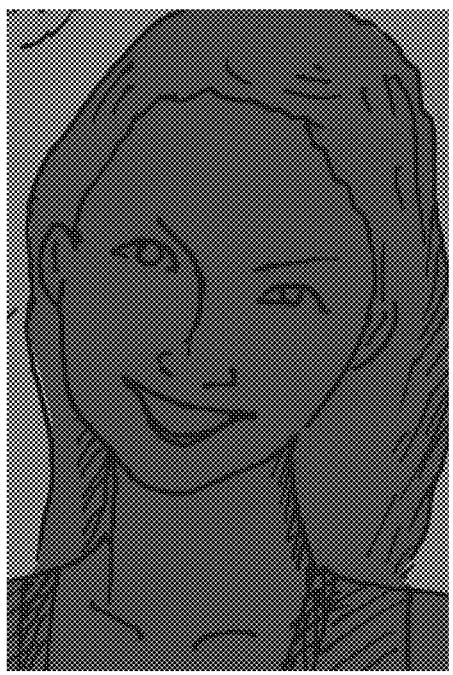
FIGS. 12A and 12B are image diagrams of portions of enlarged images of the SDR development result and the HDR development result.
Figure 12B:
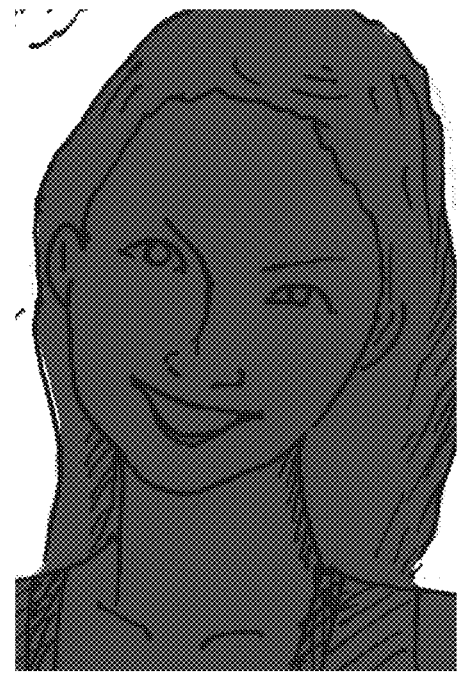
Figure 13A:
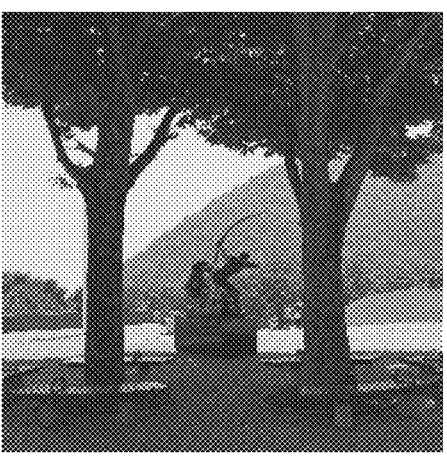
FIGS. 13A and 13B are diagrams illustrating a luminance image and a brightness perceptual image of natural scenery.
Figure 13B:
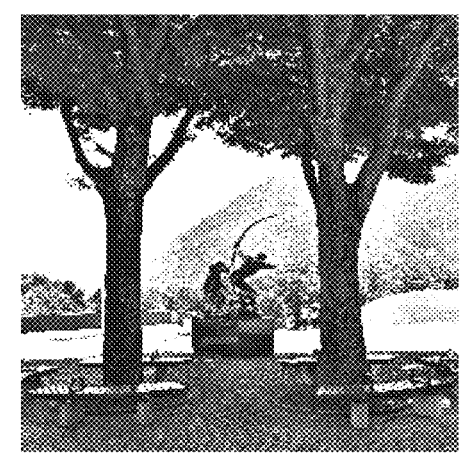

FIG. 8 is a flowchart illustrating operations of an image processing apparatus of the third embodiment. Also, FIG. 9 is a diagram illustrating the processing steps.

A luminance image conversion unit 114 converts an image signal, in ultimate angle of view, of a developed image 112 to a luminance signal, the ultimate angle of view corresponding to the region inside a trimming frame that is obtained from trimming frame information 121 (S121). Thereafter, a brightness perceptual image conversion unit 116 acquires a brightness perceptual image in which the influence of the brightness contrast in the ultimate angle of view is considered (S12. A brightness correction gain calculation unit 125 calculates a correction gain amount according to each brightness perceptual pixel value using a one-dimensional brightness correction table 127 as shown in FIG. 10 (S123). A brightness correction unit 126 can obtain a brightness corrected image 128 by applying correction gains calculated for respective pixels to the developed image 112 (S124).

As described above, according to the third embodiment, as a result of applying a correction gain calculated using a brightness perceptual image as a key instead of a luminance image, correction can be performed only on the portion that is perceived to be dark when the user views the image, and automatic correction that is highly correlated with perception becomes possible.

Although preferred embodiments of the present invention have been described above, the present invention is not limited to these embodiments, and various modifications and changes can be made without departing from the spirit of the invention.

For example, when a luminance image has been corrected considering the brightness contrast according to the above embodiments, this fact may be notified to a user. For example, the user can be aware of the fact that the luminance has been intentionally changed by displaying a notification saying that "the luminance is reduced considering the brightness contrast" along with the image.

Also, in the above embodiments, the correction gain is obtained by acquiring a plurality of brightness perceptual images and comparing these images, but the method of obtaining the correction gain is not limited thereto. The brightness contrast need not be strictly evaluated, and a method with which the degree, to some extent, of the brightness contrast can be evaluated can also be adopted. For example, in the first embodiment, the correction gain may be obtained by obtaining the ratio of the average luminance between a background portion and a main subject portion for each of a Fit image and an enlarged image, and by comparing these ratios. That is, various methods can be adopted as long as information such as an evaluation value indicating the degree of contrast ratio in each of a Fit image and an enlarged image being able to be specified, and a correction gain being able to be obtained based on the information.

Also, a description has been given using an HDR image as an example, but the image is not limited to the HDR image. For example, the present invention may be applied to images with various formats such as an SDR image having a large difference in brightness.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-014481, filed on Jan. 30, 2019, which is hereby incorporated by reference herein in its entirety.

What is claimed is:

1. An image processing apparatus comprising:
at least one processor or circuit configured to function as:
a changing unit configured to change a displayed image from a first image fully occupying a display to a second image including at least a portion of the first image, wherein the first image and the second image being obtained by image capturing;
an acquiring unit configured to acquire a first value indicating luminance, in which influence of brightness contrast is considered, in the first image and a second value indicating luminance, in which influence of brightness contrast is considered, in the second image, wherein the influence of the brightness contrast corresponds to a perceived amount of brightness of an object region based on brightness of a surrounding region of the object region in the first image and the second image; and
a correcting unit configured to correct luminance of the second image based on the first value and the second value that are acquired by the acquiring unit,
wherein the second image is an image obtained by enlarging the portion of the first image and an area ratio of the object region and the surrounding region in the second image is different from an area ratio of the object region and the surrounding region in the first image.

2. The image processing apparatus according to claim 1, wherein the at least one processor or circuit is configured to further function as a generation unit configured to generate a first brightness perceptual image with respect to the second image based on a luminance signal of the first image, and generating a second brightness perceptual image based on a luminance signal of the second image,
wherein the generation unit generates the first brightness perceptual image and the second brightness perceptual image based on human characteristics of perceiving brightness, and
the acquiring unit acquires the first value based on the first brightness perceptual image, and acquires the second value based on the second brightness perceptual image.

3. The image processing apparatus according to claim 2, wherein the first value is an average value of signal values of the first brightness perceptual image, and the second value is an average value of signal values of the second brightness perceptual image.

4. The image processing apparatus according to claim 2, wherein the first value is a median value of signal values of the first brightness perceptual image, and the second value is a median value of signal values of the second brightness perceptual image.

5. The image processing apparatus according to claim 1, wherein the at least one processor or circuit is configured to further function as a determining unit configured to determine a gain for correcting the luminance based on the first value and the second value.

6. The image processing apparatus according to claim 5, wherein the gain is a ratio between the first value and the second value.

7. The image processing apparatus according to claim 5, wherein the correcting unit corrects the luminance by multiplying a luminance signal of the second image by the gain.

8. The image processing apparatus according to claim 5, wherein the determining unit calculates a gain for correcting a dark portion of the second image based on the first value and the second value.

9. The image processing apparatus according to claim 1, wherein, when the first image is to be recorded after trimming, the luminance of the second image is not corrected.

10. The image processing apparatus according to claim 1, wherein the first image is an HDR (high dynamic range) image.

11. The image processing apparatus according to claim 10, wherein the at least one processor or circuit is configured to further function as a developing unit configured to generate the HDR image by developing a RAW image.

12. An image processing method comprising:
changing a displayed image from a first image fully occupying a display to a second image including at least a portion of the first image, wherein the first image and the second image are being obtained by image capturing;
acquiring a first value indicating luminance, in which influence of brightness contrast is considered, in the first image and a second value indicating luminance, in which influence of brightness contrast is considered, in the second image, wherein the influence of the brightness contrast corresponds to a perceived amount of brightness of an object region based on brightness of a surrounding region of the object region in the first image and the second image; and
correcting luminance of the second image based on the first value and the second value that are acquired in the acquiring,
wherein the second image is an image obtained by enlarging the portion of the first image and an area ratio of the object region and the surrounding region in the second image is different from an area ratio of the object region and the surrounding region in the first image.

13. A non-transitory computer-readable storage medium storing a program for causing a computer to execute each step of an image processing method, the method comprising:
changing a displayed image from a first image fully occupying a display to a second image including at least a portion of the first image, wherein the first image and the second image are being obtained by image capturing;
acquiring a first value indicating luminance, in which influence of brightness contrast is considered, in the first image and a second value indicating luminance, in which influence of brightness contrast is considered, in the second image, wherein the influence of the brightness contrast corresponds to a perceived amount of brightness of an object region based on brightness of a surrounding region of the object region in the first image and the second image; and correcting luminance of the second image based on the first value and the second value that are acquired in the acquiring, wherein the second image is an image obtained by enlarging the portion of the first image and an area ratio of the object region and the surrounding region in the second image is different from an area ratio of the object region and the surrounding region in the first image.

* * * * *